United States Patent
Keller et al.

(10) Patent No.: US 9,813,949 B2
(45) Date of Patent: Nov. 7, 2017

(54) TECHNIQUE FOR TERMINATING CALL SET UP IN A CSFB SITUATION

(71) Applicant: Telefonaktiebolaget L M Ericsson (publ), Stockholm (SE)

(72) Inventors: Ralf Keller, Würselen (DE); Fredrik Lindholm, Stockholm (SE); Karl-Peter Ranke, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 301 days.

(21) Appl. No.: 14/274,208

(22) Filed: May 9, 2014

(65) Prior Publication Data
US 2015/0327124 A1    Nov. 12, 2015

Related U.S. Application Data

(63) Continuation of application No. PCT/EP2014/059482, filed on May 8, 2014.

(51) Int. Cl.
*H04W 36/00*      (2009.01)
*H04L 29/06*      (2006.01)
(Continued)

(52) U.S. Cl.
CPC ..... *H04W 36/0022* (2013.01); *H04L 65/1016* (2013.01); *H04L 65/1069* (2013.01);
(Continued)

(58) Field of Classification Search
CPC .... H04L 65/1016; H04W 8/04; H04W 60/04; H04W 60/00; H04W 88/005
(Continued)

(56) References Cited

U.S. PATENT DOCUMENTS

| 7,215,961 B2 * | 5/2007 | Gallagher ............. | H04W 60/04 |
| | | | 370/331 |
| 2005/0159138 A1 * | 7/2005 | Florkey ................... | H04L 12/66 |
| | | | 455/414.1 |

(Continued)

FOREIGN PATENT DOCUMENTS

DE    WO 2012045375 A1 *   4/2012      ............. H04W 8/08

OTHER PUBLICATIONS

3GPP, "3rd Generation Partnership Project; Technical Specification Group Core Network and Terminals; IP Multimedia (IM) Core Network (CN) subsystem Centralized Services (ICS); Stage 3 (Release 12)", 3GPP TS 24.292 V12.3.0, Mar. 2014, 1-180.

(Continued)

*Primary Examiner* — Huy D Vu
*Assistant Examiner* — Nizam Ahmed
(74) *Attorney, Agent, or Firm* — Murphy, Bilak & Homiller, PLLC (57) ABSTRACT

Techniques and apparatus are described for controlling set up of a terminating call from an IMS to a UE, in a Circuit Switched Fallback (CSFB) situation. A first MSC receives a terminating call from IMS and tries to page the UE. The UE has moved to the second MSC and performs a Location Update to the second MSC. The second MSC informs the first MSC with a Send Identification message comprising an address of the second MSC. The first MSC maintains the IMS subscription of the UE at Cancel Location and forwards the terminating call to the second MSC. The first MSC acts as relay for subsequent call control messages for calls of the UE. The first and second MSCs are supervising the ongoing calls and as soon as all calls are completed the second MSC registers the UE into IMS and the first MSC de-registers the UE from IMS.

13 Claims, 5 Drawing Sheets

(51) Int. Cl.
*H04W 88/00* (2009.01)
*H04W 8/04* (2009.01)
*H04W 60/04* (2009.01)
*H04W 60/06* (2009.01)
*H04W 76/02* (2009.01)
*H04W 68/00* (2009.01)

(52) U.S. Cl.
CPC ........... H04L 65/1073 (2013.01); *H04W 8/04* (2013.01); *H04W 60/04* (2013.01); *H04W 60/06* (2013.01); *H04W 68/005* (2013.01); *H04W 76/02* (2013.01); *H04W 88/005* (2013.01)

(58) Field of Classification Search
USPC ......................................................... 370/331
See application file for complete search history.

(56) References Cited

U.S. PATENT DOCUMENTS

| | | | | |
|---|---|---|---|---|
| 2007/0053343 | A1* | 3/2007 | Suotula | H04M 7/1285 370/352 |
| 2008/0130493 | A1* | 6/2008 | Kanauchi | H04L 47/14 370/229 |
| 2008/0316998 | A1* | 12/2008 | Procopio | H04M 7/123 370/352 |
| 2010/0118861 | A1* | 5/2010 | Witzel | H04W 60/04 370/352 |
| 2010/0254372 | A1* | 10/2010 | Keller | H04M 3/02 370/352 |
| 2013/0210466 | A1* | 8/2013 | Arvidsson | H04W 4/025 455/458 |
| 2014/0128113 | A1* | 5/2014 | Zisimopoulos | H04W 4/14 455/466 |
| 2015/0173123 | A1* | 6/2015 | Luessem | H04L 65/1016 370/328 |
| 2016/0150497 | A1* | 5/2016 | Janosi | H04L 65/1016 455/435.1 |

OTHER PUBLICATIONS

3GPP, "3rd Generation Partnership Project; Technical Specification Group Services and System Aspects; IP Multimedia Subsystem (IMS) centralized services; Stage 2 (Release 12)", 3GPP TS 23.292 V12.3.0, Mar. 2014, 1-120.

Poikselkä, Miika et al., "VoLTE End to End and Signalling", Voice Over LTE, John Wiley & Sons, Ltd, Chichester, UK, Feb. 1, 2015, 99-215.

3GPP, "3rd Generation Partnership Project; Technical Specification Group Core Network and Terminals; Basic call handling; Technical realization (Release 12)", 3GPP TS 23.018 V12.2.0, Sep. 2013, 1-296.

3GPP, "3rd Generation Partnership Project; Technical Specification Group Core network and Terminals; Interworking between the IP Multimedia (IM) Core Network (CN) Subsystem (IMS) and MSC Server for IMS Centralized Services (ICS) (Release 12)", 3GPP TS 29.292 V12.1.0, Sep. 2013, 1-27.

3GPP, "3rd Generation Partnership Project; Technical Specification Group Services and System Aspects; Circuit Switched (CS) fallback in Evolved Packet System (EPS); Stage 2 (Release 12)", 3GPP TS 23.272 V12.2.0, Mar. 2014, 1-100.

* cited by examiner

TECHNIQUE FOR TERMINATING CALL SET UP IN A CSFB SITUATION

RELATED APPLICATION

Pursuant to 35 U.S.C. §120, this application claims priority to and the benefit of International Patent Application PCT/EP2014/059482, filed 8 May 2014, the entire contents of which are incorporated herein by reference.

TECHNICAL FIELD

The present disclosure generally relates to telecommunications and in particular to Circuit Switched Fallback (CSFB) in an IMS Centralized Services (ICS) scenario. A technique for controlling set up of a terminating call to a User Equipment (UE) in a CSFB situation is described.

BACKGROUND

CSFB is specified today in the 3rd Generation Partnership Project (3GPP) Technical Specification (TS) 23.272 (see, e.g., V12.2.0 of March 2014). In brief, CSFB permits in an Evolved Packet System (EPS) the provisioning of voice and other CS domain services (such as services pertaining to Unstructured Supplementary Service Data, or USSD) by re-use of CS infrastructure when the UE is served by the Evolved UMTS Terrestrial Radio Access Network (E-UTRAN). A CSFB-enabled UE, connected to E-UTRAN, may thus use 2nd or 3rd Generation (2G or 3G) technologies such as GSM Edge RAN (GERAN) or UTRAN to connect to the CS domain.

The mechanism for handling a terminating call needed to be modified in certain CSFB scenarios. Specifically, CSFB is only available in case E-UTRAN coverage (as defined by Tracking Areas, or TAs) is overlapped by either GERAN or UTRAN coverage (as defined by, for example, Location Areas, or LAs). A general problem results from the fact that there exists no 1:1 mapping between TAs and LAs.

For a terminating call the lacking congruency between TAs and LAs may have the consequence that the UE, when falling back from E-UTRAN to GERAN or UTRAN, may land in a LA that is not controlled by the "old" MSC-S towards which the SGs interface association for the UE has been established by the MME. In such a case the "old" MSC-S will not be able to terminate the call.

Mobile Terminating Roaming Forwarding (MTRF) is a procedure that has been specified in 3GPP TS 23.018 (V12.2.0 September 2013), in order to deliver mobile terminating calls to subscribers that change MSC area during the setup of a terminating call. The MTRF procedure may be applied for CS calls towards mobile subscribers roaming in GERAN or UTRAN access, but also towards mobile subscribers performing CS fallback from E-UTRAN to GERAN or UTRAN, as specified in 3GPP TS 23.272.

In addition, 3GPP specifies the concept of IMS centralized services (ICS) in TS 23.292, TS 24.292 and TS 29.292. ICS allows IMS subscribers to get services executed in IMS when they are connected via CS radio access. One way to deploy ICS is to enhance the MSC with ICS support, and such an MSC is called 'MSC server enhanced for ICS' in the 3GPP standards. The MSC Server enhanced for ICS is connected with the IMS domain via a so called I2 interface.

When the UE registers in the MSC Server enhanced for ICS via a CS Location Update procedure and the subscriber is an ICS subscriber (for example determined by an indication received from the HLR as part of the subscriber data), the MSC Server enhanced for ICS shall register the subscriber in IMS.

When the MSC has registered the ICS subscriber in IMS, then IMS may route terminating calls (voice or video call) for that subscriber directly to that MSC based on the information received at the IMS Registration procedure, as defined in 3GPP TS 23.292 for IMS calls.

This means that for terminating calls from IMS no GMSC and no related roaming number retrieval procedure is applied. But the current solutions specified for MTRF do not cope for the case that the MSC is enhanced for ICS and that the user is an ICS user.

SUMMARY

There is a clear need for an improved MTRF procedure, taking into account the situation that the MSCs are enhanced for ICS and that the user is an ICS user.

It is an object of the present invention to improve the control of the set-up of a terminating call from an IMS to a UE in a CSFB situation for ICS users. This object is achieved by the independent claims. Advantageous embodiments are described in the dependent claims.

According to an exemplary aspect of the invention, a method in a Mobile Switching Center (MSC) for controlling set up of a terminating call from an IP Multimedia Subsystem (IMS) to a User Equipment (UE) in a Circuit Switched Fallback (CSFB) situation, is provided. The MSC supports IMS Centralized Services, ICS. The method comprises paging of the UE and receiving a Send Identification message from a further MSC, wherein the further MSC also supports ICS. The method also comprises receiving a Cancel Location message from a Home Location Register, HLR and forwarding the terminating call set up request to the further MSC. The method further comprises relaying further messages related to ongoing calls of the UE between the further MSC and the IMS and determining that all calls of the UE have ended. The method also comprises triggering de-registration of the UE from the IMS, when all calls of the UE have ended.

According to another exemplary aspect of the invention, a method in a Mobile Switching Center (MSC) for controlling set up of a terminating call from an IP Multimedia Subsystem (IMS) to a User Equipment (UE) in a Circuit Switched Fallback (CSFB) situation, is provided. The MSC supports IMS Centralized Services, ICS. The method comprises receiving a location update request from the UE and sending a Send Identification message to a further MSC, wherein the further MSC also supports ICS. The method comprises receiving a terminating call set up request from the further MSC. The method also comprises receiving further messages related to ongoing calls of the UE from the IMS via the further MSC and sending further messages related to ongoing calls of the UE to the IMS via the further MSC. The method further comprises determining that all calls of the UE have ended and triggering registration of the UE into the IMS, when all calls of the UE have ended.

According to another exemplary aspect of the invention, a Mobile Switching Center (MSC) for controlling set up of a terminating call from an IP Multimedia Subsystem (IMS) to a User Equipment (UE) in a Circuit Switched Fallback (CSFB) situation is provided. The MSC supports IMS Centralized Services, ICS. The MSC is capable to page the UE and to receive a Send Identification message from a further MSC, wherein the further MSC also supports ICS. The MSC is also capable to receive a Cancel Location message from a Home Location Register, HLR, and to forward the terminating call set up request to the further MSC. The MSC is further capable to relay further messages related to ongoing calls of the UE between the further MSC and the IMS and to determine that all calls of the UE have ended. The MSC is also capable to trigger de-registration of the UE from the IMS, when all calls of the UE have ended.

According to another exemplary aspect of the invention, a Mobile Switching Center (MSC) for controlling set up of a terminating call from an IP Multimedia Subsystem (IMS) to a User Equipment (UE) in a Circuit Switched Fallback (CSFB) situation, is provided. The MSC supports IMS Centralized Services, ICS. The MSC is capable to receive a location update request from the UE and to send a Send Identification message to a further MSC, wherein the further MSC is also supporting ICS. The MSC is further capable to receive a terminating call set up request from the further MSC. The MSC is also capable to receive further messages related to ongoing calls of the UE from the IMS via the further MSC and to send further messages related to ongoing calls of the UE to the IMS via the further MSC. The MSC is further capable to determine that all calls of the UE have ended, and to trigger registration of the UE into the IMS, when all calls of the UE have ended.

According to another exemplary aspect of the invention, a system for controlling set up of a terminating call from an IP Multimedia Subsystem (IMS) to a User Equipment (UE) in a Circuit Switched Fallback (CSFB) situation, is provided. The system comprises a first Mobile Switching Center (MSC) a second (MSC) an IMS, a UE, and a Home Location Register, HLR. The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

In the following, a system, methods, nodes, and computer programs for controlling set up of a terminating call from an IMS to a UE in a CSFB situation for ICS users according to the invention are described in more detail.

Within the context of the present application, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G/GSM, 3G/WCDMA, CDMA, LTE, WLAN, Wi-Fi), mobile backhaul network, or core network such as IMS, CS Core, PS Core.

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "MSC" refers to a control node of the circuit switched communication network, for example a MSC. The MSC may be combined with a Visited Location Register (VLR) and be therefore also called MSC/VLR. The MSC node may also be enabled to control a remote Media Gateway (MGW) and therefore act as a server and may therefore be also called MSC Server or short MSC-S. Within the context of the present application MSC, MSC/VLR and MSC-S are functional equivalent. The term MSC also corresponds to the 'MSC server enhanced for ICS' in the 3GPP standards.

Within the context of the present application, the term "HLR" refers a subscriber database of the circuit switched communication network, for example a HLR. The HLR may be combined with or may be integrated part of a Home Subscriber Server (HSS).

Figure 1:
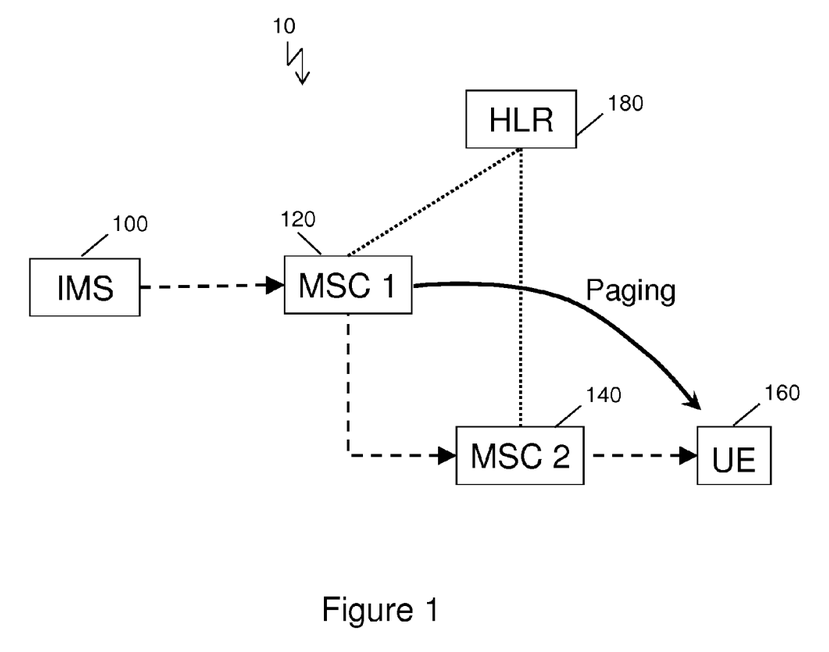
FIG. 1 shows a diagram illustrating a system for control of the set-up of a terminating call from an IMS to a UE in a CSFB situation for ICS users according to the invention.

Referring to FIG. 1, this figure shows a system for controlling set up of a terminating call from an IMS to a UE in a CSFB situation for ICS users according to the invention.

Here it is assumed that both MSC, MSC 1 120 and MSC 2 140, support ICS functionality. The figure shows a delivery of a terminating call from IMS 100 to a UE 160 in a communication network 10. The UE 160 is registered in IMS 100, and as part of a previous registration procedure the IMS 100 learned the address of MSC 1 120 as the as the address to be contacted for terminating calls.

When now a terminating call is to be delivered, the IMS 100 forwards the terminating call set up request to the MSC 1 120. The MSC 1 120 then pages the UE 160. In a CSFB situation, the lacking congruency between TAs and LAs have the effect that the UE 160, when falling back from E-UTRAN to GERAN or UTRAN, lands in a LA that is not controlled by the MSC 1 120. In such a case the MSC 1 120 will not be able to terminate the call, so the paging request by MSC 1 120 towards the UE 160 is not responded to.

Instead the UE 160, after having received the page request via E-UTRAN, falls back to GERAN or UTRAN, and performs a Location Update procedure towards MSC 2 140 (as it is new in this LA and in that MSC 2 140. The HLR 180 is then informed and subscriber data are downloaded from HLR 180 to the MSC 2 140. The HLR 180 then cancels the CS registration in MSC 1 120.

However, MSC 1 120 keeps the IMS 100 registration of the UE 160 active and MSC 2 140 does not yet register the UE 160 into IMS 100. The MSC 1 120 then forwards the terminating call set up request to MSC 2 140 and MSC 2 140 delivers the terminating call set up request to the UE 160.

While the terminating call is ongoing, the UE 160 may initiate new calls, which are then relayed by MSC 1 120 from MSC 2 140 to IMS 100. As long as there is at least one call of the UE 160 still ongoing, MSC 1 120 relays any related call control signaling between the IMS 100 and the MSC 2 140.

When all calls of the UE 160 have ended, MSC 2 140 triggers registration of the UE 160 into IMS 100, and MSC 1 120 triggers de-registration of the UE 160 from IMS 100. From then onwards any terminating call set up requests will straight go from IMS 100 to MSC 2 140.

This procedure allows to successfully deliver terminating calls in a CSFB situation, if both MSC, MSC 1 120 and MSC 2 140 support ICS functionality and the user of the UE 160 is a subscriber with ICS subscription.

Figure 2:
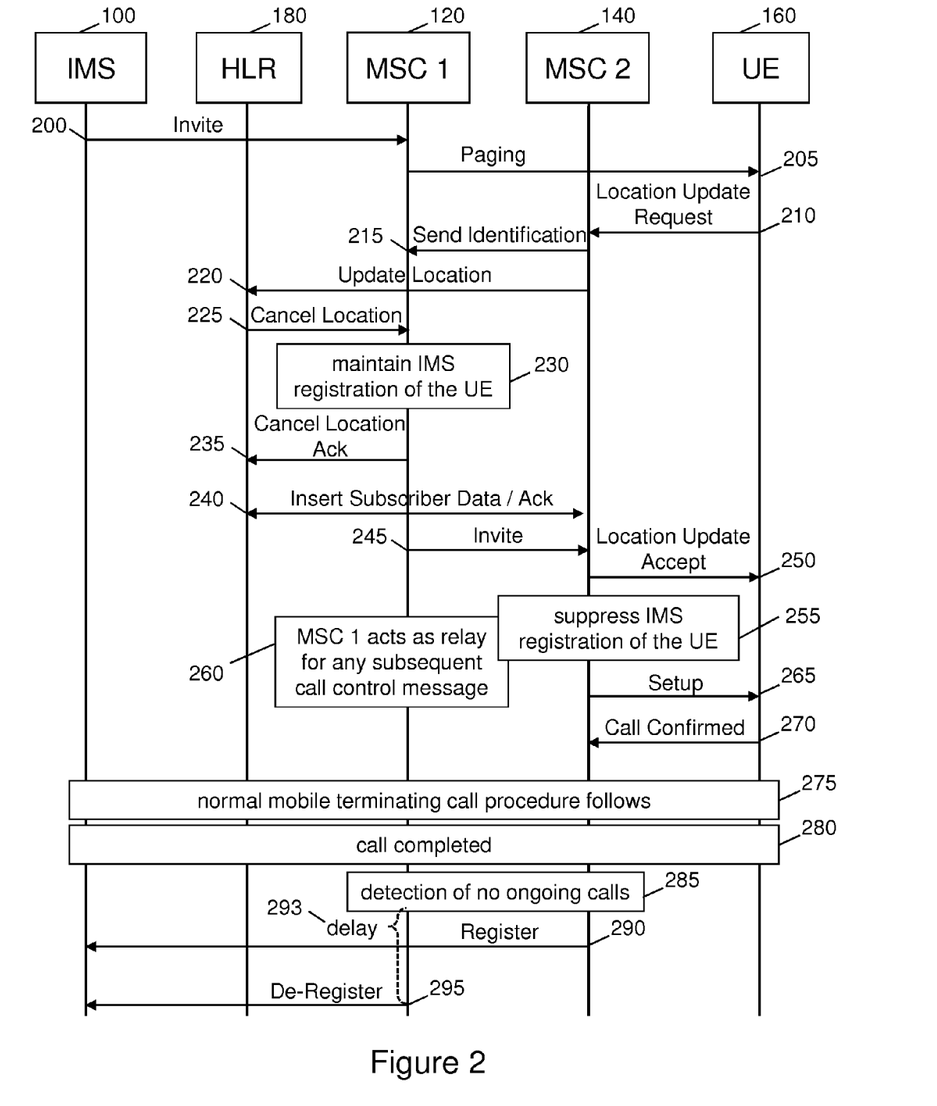
FIG. 2 shows a sequence diagram for control of the set-up of a terminating call from an IMS to a UE in a CSFB situation for ICS users according to prior art.

Further details of the signaling sequence are shown in FIG. 2.

Referring to FIG. 2, this figure shows a sequence diagram for controlling set up of a terminating call from an IMS to a UE in a CSFB situation for ICS users according to the invention.

The sequence diagram is simplified and focuses on a high-level flow of events and related information. Some real messages are omitted in order to improve the clarity. The shown messages are named according to their function and do not mean real protocol messages.

The IMS 100 has to deliver a terminating call to the UE 160. From recent IMS registration procedures the IMS 100 knows the contact address of the MSC 1 120. So the IMS 100 sends the terminating call set up by sending an Invite message 200 to the MSC 1 120. This Invite message may correspond to a SIP Invite message.

The MSC 1 120 receives the Invite message 200 from the IMS 100. In order to deliver the terminating call request to the UE 160 the MSC 1 120 pages 205 the UE 160. This may be done via corresponding E-UTRAN paging mechanisms.

The UE 160 receives the paging indication via E-UTRAN. In order to accept the terminating call, the UE 160 falls back to UTRAN or GERAN radio. In such a CSFB scenario, the UTRAN or GERAN radio cell and location area used by the UE 160 belongs to MSC 2 140, therefore the UE 160 performs first a location update procedure by sending Location Update Request 210 message to the MSC 2 140. This Location Update Request message may be a corresponding DTAP (Direct Transport Application Part) or RANAP (Radio Access Network Application Part) message.

The Location Update message may comprise a Circuit Switched Mobile Terminating (CSMT) flag, indicating to the MSC 2 140 that the Location Update is due to CSFB.

The MSC 2 140 receives the Location Update Request 210 message. From the information in that message the MSC 2 140 derives the previous MSC, MSC 1 120. MSC 2 140 then sends a Send Identification 215 message to the MSC 1 120. This Send Identification 215 message may be a corresponding MAP (Mobile Application Part) message or also a SIP message or any other message capable of informing MSC 1 120 that MSC 2 140 supports ICS and to deliver a contact address of MSC 2 140 to MSC 1 120.

By alternative the MSC 1 120 may know the MSC 2 140 address from configuration within the node, inserted by the network operator. In this case the information that MSC 2 140 supports ICS is enough for MSC 1 120 to trigger the forwarding of the terminating call request. The MSC 1 120 may also know that the MSC 2 140 supports ICS from configuration within the node, inserted by the network operator. In this case no further information is needed in the Send Identification 215 message to the MSC 1 120. The support of ICS in MSC 2 140 may also be used as an implicit indication that the MSC 2 140 supports a SIP interface for forwarding of the terminating call request.

By alternative, also other call/session control protocols may be used between MSC 1 120 and MSC 2 140 such as a BICC (Bearer Independent Call Control) protocol.

In yet another alternative, the MSC 2 140 may not support ICS functionality, but still support a SIP interface and MTRF functionality. In this case the MSC 2 140 may indicate a contact address but no ICS support indicator.

MSC 1 120 receives the Send Identification 215 message and extracts the contained information, such as ICS support of MSC 2 140 and/or a contact address of MSC 2 140.

Triggered by the reception of Location Update request 210 message (and the fact that UE 160 is new in this MSC 2 140), the MSC 2 140 sends an Update Location 220 message to the HLR 180. The Update Location 220 message may be a corresponding MAP message.

The HLR 180 receives the Update Location 220 message and triggers canceling of the old CS registration in MSC 1 120, by sending Cancel Location 225 message to the MSC 1 120. The Cancel Location 225 message may be a corresponding MAP message.

MSC 1 120 receives the Cancel Location 225 message, but MSC 1 120 maintains 230 the IMS 100 registration of the UE 160, and responds with Cancel Location Acknowledgement 235 message to the HLR 180. In the prior art the MSC 1 120 must de-register the UE 160 from IMS 100. The Cancel Location Acknowledgement 235 message may be a corresponding MAP message.

After that the downloading of subscriber data is performed by one or several Insert Subscriber Data/Insert Subscriber Data Acknowledgement 240 message exchanged between HLR 180 and MSC 2 140. The Insert Subscriber Data/Insert Subscriber Data Acknowledgement 240 messages may be corresponding MAP messages. The received subscriber data may also comprise an indication that the subscriber using the UE 160 is an ICS subscriber having a subscription to ICS.

In a next step the MSC 1 120 forwards the terminating call set up request by sending a SIP Invite 245 message to the MSC 2 140. MSC 1 120 uses the contact address of the MSC 2 140 as received in the Send Identification 215 message to address the MSC 2 140. Also other protocols may be used such as BICC, in this case the message would be an IAM (Initial Address Message).

In the meantime MSC 2 140 receives the SIP Invite 245 message. After successful downloading of subscriber data to MSC 2 140, MSC 2 140 accepts the UE's 160 location update request by sending Location Update Accept 250 message to the UE 160. The Location Update Accept 250 message may be a corresponding DTAP or RANAP message.

The UE 160 receives the Location Update Accept 250 message.

The MSC 2 140 at this point suppresses 255 the IMS 100 registration of the UE 160. So the UE 160 remains to be registered in IMS 100 with MSC 1 120 as the contact address. In the prior art MSC 1 120 must register the UE 160 into IMS 100, if the subscriber has a subscription to ICS.

In the meantime MSC 1 120 has started to act as relay 260 for any subsequent call control messages, between the IMS 100 and the MSC 2 140 and vice versa.

The MSC 2 140 then delivers the terminating call setup request to the UE 160 by sending Setup 265 message to the UE 160. The UE 160 receiving the Setup 265 message responds with Call Confirmed 270 message to the MSC 2 140. Both messages may be a corresponding DTAP or RANAP message. The MSC 2 140 receives the Call Confirmed 270 message.

After that the normal mobile terminating call procedures 275 takes place. These details are omitted for simplification reasons.

Both, MSC 1 120 and MSC 2 140 then start to supervise the ongoing call. Since the IMS 100 registration has not been changed yet, further terminating call requests may be received from IMS 100 in MSC 1 120. MSC 1 120 may relay also these new terminating call set up requests to MSC 2 140, and also relay their related call control signaling. In order to limit this signaling relay functionality, MSC 1 120 may reject any further terminating call set up request by responding with an "user busy" indication back to IMS 100. In that case only one call needs to be relayed. In the same way the MSC 2 140 may not allow establishment of further calls via the MSC 1 120. This rejection may be based on an operator preference, the current load situation in the MSC node, or on the type of subscriber, so whether the subscriber is an own subscriber or a visited subscriber.

While the terminating call is ongoing, the UE 160 may initiate a further call in parallel to the ongoing terminating call (also known as enquiry call). Since the UE 160 is still registered in IMS 100 via the contact in MSC 2 140, such parallel calls and their related call control signaling are to be relayed via MSC 1 120 as well. So MSC 2 140 forwards such parallel calls to MSC 1 120 which then relays them to IMS 100.

While the originating call is ongoing, the original terminating call may be released and the originating call may remain as the only ongoing call. In the same manner new originating or terminating call requests may come in, resulting in any combination of originating and terminating calls as ongoing calls of the UE 160.

By alternative, the MSC 2 140 may reject any parallel originating call requests from the UE 160 in order to limit this signaling relay functionality of MSC 1 120.

Then in 280 any ongoing call of the UE 160 is completed, i.e. any call has ended. A check 285 is performed in MSC 1 120 and MSC 2 140 whether there is no ongoing call of the UE 160 anymore.

If there is no ongoing call of the UE 160 anymore in MSC 2 140, MSC 2 140 triggers registration of the UE 160 into IMS 100 by sending a Register 290 message (which may correspond to SIP Register message).

If there is no ongoing call of the UE 160 anymore in MSC 1 120, the MSC 1 120 triggers de-registration 295 of the UE 160 from IMS 100, after applying a delay period 293. MSC 1 120 does the de-registration 295 by sending a SIP Register message to IMS 100 with a zero expiration value, so immediate expiry. The delay period applied by MSC 1 120 may be adjusted to be long enough to ensure that the re-registration from the MSC 1 120 arrives at the IMS 100 after the registration request from MSC 2 140 has been handled. This may optimize the registration handling in IMS 100 as IMS 100 may keep up the UE 160 registration and just replace the contact address of MSC 1 120 with contact address of MSC 2 140. The delay period value may be configured by the network operator or may depend on whether the subscriber is a visited or a home subscriber.

Figure 3:
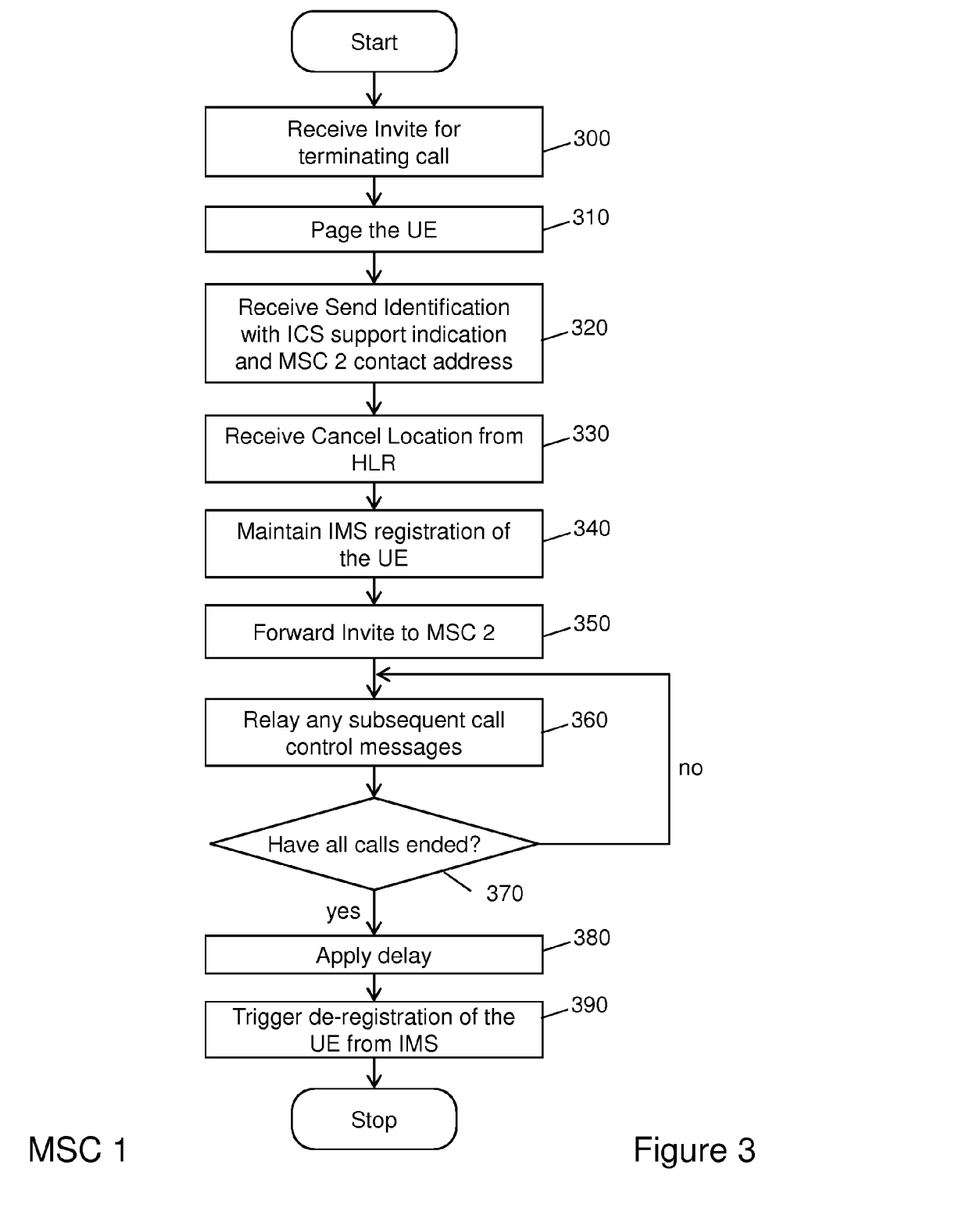
FIG. 3 shows a flow diagram in a first MSC for control of the set-up of a terminating call from an IMS to a UE in a CSFB situation for ICS users according to the invention.

Referring to FIG. 3, this figure shows a flow diagram in a first MSC 120 for controlling set up of a terminating call from an IMS 100 to a UE 160 in a CSFB situation for ICS users according to the invention.

The flow starts with the reception of a terminating call request from IMS 300. This may be a SIP Invite message. The first MSC 120 then pages 310 the UE 160.

In the next step 320 the first MSC 120 receives a Send Identification message. This Send Identification message may be a corresponding MAP message or a SIP message. The message comprises an indication that the second MSC 140 supports ICS functionality and a contact address of the second MSC 140. This information may also be omitted if the corresponding information is already available in the first MSC 120 by configuration of the node by the network operator.

In the next step 330 the first MSC 120 receives a Cancel Location message from HLR 180. In this case the first MSC 120 maintains 340 the IMS 100 registration of the UE 160 in IMS 100.

Then the first MSC 120 forwards the terminating call set up request to the second MSC 140 by sending forward 350 the SIP Invite to the second MSC 140.

The flow then enters a loop. The first MSC 120 relays 360 any subsequent call control messages received from the second MSC 140 to the IMS 100 and vice versa. Then the first MSC 120 checks whether the call has ended 370. Note that in this flow only a single terminating call at a time is considered. In an alternative solution also further parallel calls of the UE 160 may be handled. So if the terminating call is still active, the flow loops back to step 360 and keeps on relaying 360 subsequent call control messages.

If the terminating call has ended, the first MSC 120 applies a delay. The value of delay may be configured by the network operator in the first MSC 120. When the delay has expired, the first MSC 120 triggers 390 the de-registration of the UE 160 from IMS 100. This may be done by sending a SIP Registration with a zero expiration value, so immediate expiry, to IMS 100. This optimized the registration handling in IMS 100 as IMS 100 may keep up the UE 160 registration and just replace the contact address of MSC 1 120 with contact address of MSC 2 140. Then the flow ends.

Figure 4:
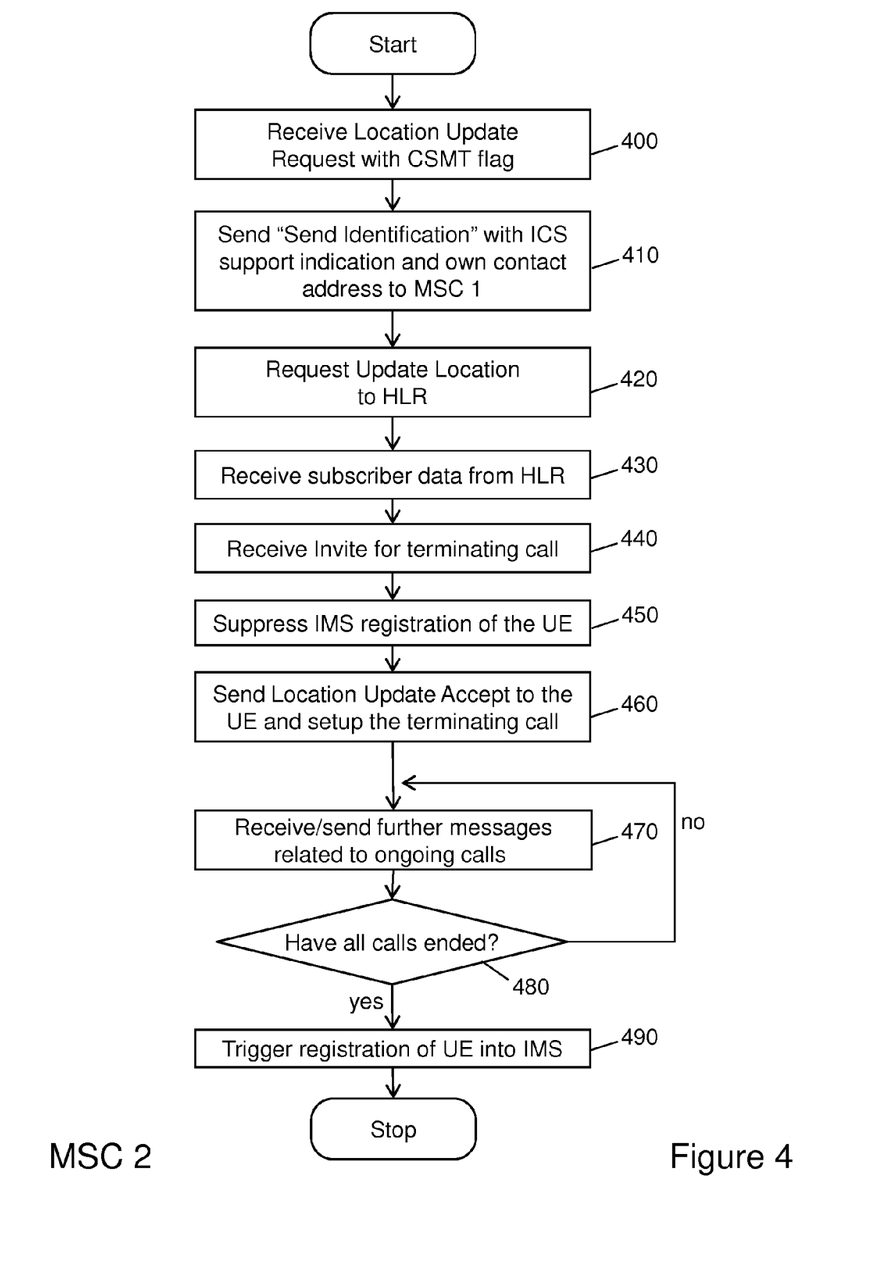
FIG. 4 shows a flow diagram in a second MSC for control of the set-up of a terminating call from an IMS to a UE in a CSFB situation for ICS users according to the invention.

Referring to FIG. 4, this figure shows a flow diagram in a second MSC 140 for controlling set up of a terminating call from an IMS 100 to a UE 160 in a CSFB situation for ICS users according to the invention.

The flow starts with the reception 400 of a Location Update Request message from the UE 160. This message may comprise a CSMT flag indicating that the Location Update is related to a CSFB scenario.

The second MSC 140 then sends 410 a Send Identification message to the first MSC 120. This may be a corresponding MAP message or also a SIP message. The message may comprise information that the second MSC 140 supports ICS and the contact address of the second MSC 140.

Then the second MSC 140 requests 420 Update Location towards HLR 180 and subscriber data is received from HLR 180 in step 430. This subscriber data may also comprise information that the subscriber using the UE 160 has a subscription to ICS.

Then a terminating call set up request is received in step 440. This then triggers the second MSC 140 to suppress 450 the registration of the UE 160 in IMS 100.

Then the second MSC 140 sends 460 the Location Update Accept to the UE 160 and continues with the set-up of the terminating call.

The flow then enters a loop. The second MSC 140 sends and receives further messages related to the terminating call.

Note that in this flow only a single terminating call at a time is considered. In an alternative solution also further parallel calls of the UE 160 may be handled. Then the second MSC 140 checks whether the call has ended 480. So if the terminating call is still active, the flow loops back to step 470 and keeps on sending/receiving receives further messages related to the terminating call.

If the terminating call has ended, the second MSC 140 triggers 490 the registration of the UE 160 into IMS 100. This is done by sending a SIP Registration message to IMS 100. Then the flow ends.

Figure 5:
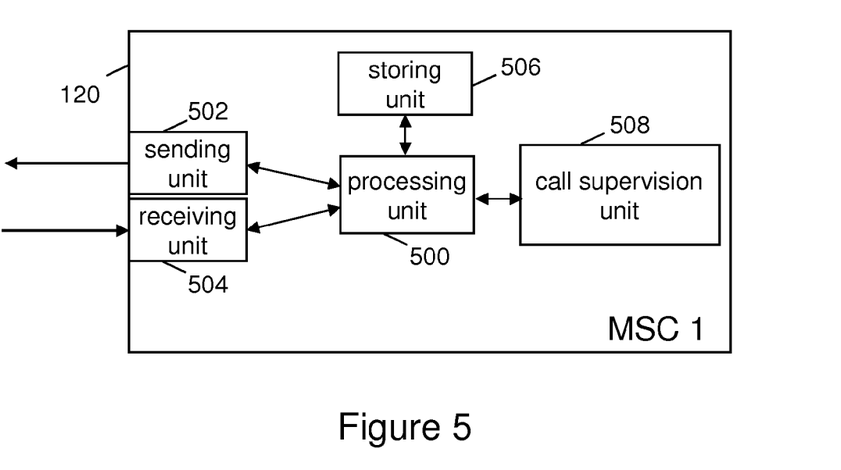
FIG. 5 shows a block diagram illustrating a first MSC for control of the set-up of a terminating call from an IMS to a UE in a CSFB situation for ICS users according to the invention.

Referring to FIG. 5, this figure shows a block diagram illustrating a MSC 1 for controlling set up of a terminating call from an IMS to a UE in a CSFB situation for ICS users according to an embodiment. The illustrated entity may correspond to the MSC 1 120. The MSC 1 120 may be adapted to perform one or more steps of the above described method shown in FIG. 3.

The MSC 120 may comprise a number of functional units, which are described in further detail below and which are adapted to perform respective method steps.

A processing unit 500 of the MSC 120 may be adapted to page a UE 160, receive a Send Identification message from a second MSC 140, receive a Cancel Location message from a HLR 180, forward the terminating call set up request to the MSC 2 140, relay further messages related to terminating calls between the MSC 2 140 and the IMS 100, and trigger de-registration of the UE 160 from the IMS 100. In a practical implementation the processing unit 500 may be one processor taking care of all the above functions, or may also be distributed over more than one processor, wherein the functions are distributed over the available processors.

The MSC 120 may further comprise a sending unit 502 and a receiving unit 504 via which the MSC 120 can communicate with other entities of the communication network 10 such as the MSC 2 140, the HLR 180, or the IMS 100. The sending unit 502 may send out signaling messages composed by the processing unit 500. The receiving unit 504 may receive signaling messages from the MSC 2 140, the HLR 180, or the IMS 100 and forward the received signaling messages to the processing unit 500 for handling. The MSC 120 may comprise more than one sending unit and receiving unit for signaling capacity and redundancy reasons.

The MSC 120 may also comprise a storing unit 506 for storing information related to controlling set up of a terminating call from an IMS to a UE in a CSFB situation for ICS users. The storing unit 506 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 506 may be used by the processing unit 500 to store information, for example program code or a MSC 2 140 contact address.

The MSC 120 may also comprise a call supervision unit 508 for determining whether the terminating call relayed to the MSC 2 140 has ended. This supervision unit 508 may also implement the delay timer to delay the de-registration trigger of the UE 160 from IMS 100. A timer may for example be implemented by a periodic interrupt signal from the processing unit 500 and a counter or a shift register.

Figure 6:
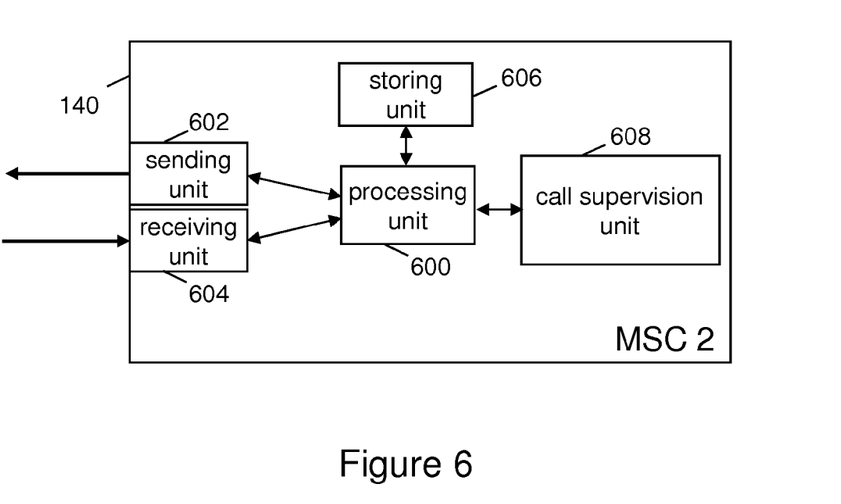
FIG. 6 shows a block diagram illustrating a second MSC for control of the set-up of a terminating call from an IMS to a UE in a CSFB situation for ICS users according to the invention.

Referring to FIG. 6, this figure shows a block diagram illustrating a MSC 2 for controlling set up of a terminating call from an IMS to a UE in a CSFB situation for ICS users according to an embodiment. The illustrated entity may correspond to the MSC 2 140. The MSC 2 140 may be adapted to perform one or more steps of the above described method shown in FIG. 4.

The MSC 140 may comprise a number of functional units, which are described in further detail below and which are adapted to perform respective method steps.

A processing unit 600 of the MSC 140 may be adapted to receive a location update request from a UE 160, receive a terminating call set up request from a MSC 1 120, receive further messages related to terminating calls from the IMS 100 via the MSC 1 120, send further messages related to terminating calls to the IMS 100 via the MSC 1 120, and trigger registration of the UE 160 into the IMS 100). In a practical implementation the processing unit 600 may be one processor taking care of all the above functions, or may also be distributed over more than one processor, wherein the functions are distributed over the available processors.

The MSC 140 may further comprise a sending unit 602 and a receiving unit 604 via which the MSC 140 can communicate with other entities of the communication network 10 such as the MSC 1 120 or the HLR 180. The sending unit 602 may send out signaling messages composed by the processing unit 600. The receiving unit 604 may receive signaling messages from the MSC 1 120, or the HLR 180 and forward the received signaling messages to the processing unit 600 for handling. The MSC 140 may comprise more than one sending unit and receiving unit for signaling capacity and redundancy reasons.

The MSC 140 may also comprise a storing unit 606 for storing information related to controlling set up of a terminating call from an IMS to a UE in a CSFB situation for ICS users. The storing unit 606 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 606 may be used by the processing unit 600 to store information, for example program code or subscriber data.

The MSC 140 may also comprise a call supervision unit 608 for determining whether the terminating call from the MSC 1 120 has ended. When the call has ended, this may trigger the registration of the UE 160 into the IMS 100.

According to another embodiment, a computer program is provided. The computer program may be executed by the processing units 500 and/or 600 of the above mentioned entities 120 and/or 140 respectively such that a method for controlling set up of a terminating call from an IMS to a UE in a CSFB situation for ICS users as described above with reference to FIG. 3 or 4 may be carried out or be controlled. In particular, the entities 120 and/or 140 may be caused to operate in accordance with the above described method by executing the computer program.

The computer program may be embodied as computer code, for example of a computer program product. The computer program product may be stored on a computer readable medium, for example a disk or the storing unit 506 and/or 606 of the entities 120 and/or 140, or may be configured as downloadable information.

One or more embodiments as described above may enable at least one of the following technical effects:
- Allows to use MTRF for ICS subscribers that are registered in an MSC enhanced for ICS
- The solution does not impact the HPLMN network, changes are needed only in MSCs of the VPLMN
- Minimal additional call setup delay
- Relaying resources in the first MSC are used only for the duration of the call Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a Mobile Switching Center (MSC) for controlling set up of a terminating call from an IP Multimedia Subsystem (IMS) to a User Equipment (UE) in a Circuit Switched Fallback (CSFB) situation, the MSC supporting IMS Centralized Services (ICS), the method comprising:
    receiving, from the IMS, a terminating call set up request for the UE;
    in response to reception of the terminating call set up request, sending a paging message to the UE;
    subsequent to sending of the paging message, receiving a Send Identification message from a further MSC, the further MSC supporting ICS and the Send Identification message including an identification for the further MSC;
    subsequent to sending of the paging message, receiving a Cancel Location message from a Home Location Register (HLR);
    responsive to receiving the Send Identification message from the further MSC, forwarding the terminating call set up request to the further MSC;
    subsequent to forwarding the terminating call set up request, relaying further messages related to ongoing calls of the UE between the further MSC and the IMS;
    determining that all calls of the UE have ended; and
    triggering de-registration of the UE from the IMS responsive to the determination that all calls of the UE have ended.

2. The method of claim 1, wherein the Send Identification message from the further MSC comprises an ICS support indication and a contact address of the further MSC.

3. The method of claim 1, wherein the MSC maintains the IMS registration of the UE in the IMS after reception of the Cancel Location message.

4. The method of claim 1, wherein the de-registration of the UE from the IMS after all calls of the UE have ended is triggered with a delay.

5. A method in a Mobile Switching Center (MSC) for controlling set up of a terminating call from an IP Multimedia Subsystem (IMS) to a User Equipment (UE) in a Circuit Switched Fallback (CSFB) situation, the MSC supporting IMS Centralized Services (ICS) the method comprising:
    receiving a location update request from the UE;
    responsive to reception of the location update request, sending a Send Identification message to a further MSC, the further MSC supporting ICS and the Send Identification message including an identification for the MSC;
    subsequent to sending of the send Identification message, receiving a terminating call set up request from the further MSC and forwarding the terminating call set up request to the UE;
    subsequent to reception of the terminating call set up request, receiving further messages related to ongoing calls of the UE from the IMS via the further MSC;
    subsequent to reception of the terminating call set up request, sending further messages related to ongoing calls of the UE to the IMS via the further MSC;
    determining that all calls of the UE have ended; and
    triggering registration of the UE into the IMS responsive to the determination that all calls of the UE have ended.

6. The method of claim 5, wherein the location update request comprises a Circuit Switched Mobile Terminating (CSMT) flag, indicating to the MSC that the location update request is due to CSFB.

7. The method of claim 5, wherein the Send Identification message to the further MSC comprises an ICS support indication and a contact address of the MSC.

8. The method of claim 5, wherein the MSC suppresses registration of the UE into IMS at reception of the terminating call set up request.

9. A Mobile Switching Center (MSC) for controlling set up of a terminating call from an IP Multimedia Subsystem (IMS) to a User Equipment (UE) in a Circuit Switched Fallback (CSFB) situation, the MSC supporting IMS Centralized Services (ICS), the MSC being configured to:
    receive, from the IMS, a terminating call set up request for the UE;
    in response to reception of the terminating call set up request, send a paging message to the UE;
    subsequent to sending of the paging message, receive a Send Identification message from a further MSC, the further MSC supporting ICS and the Send Identification message including an identification for the further MSC;
    subsequent to sending of the paging message, receive a Cancel Location message from a Home Location Register (HLR);
    responsive to reception of the Send Identification message from the further MSC, forward the terminating call set up request to the further MSC;
    subsequent to forwarding the terminating call set up request, relay further messages related to ongoing calls of the UE between the further MSC and the IMS;
    determine that all calls of the UE have ended; and
    trigger de-registration of the UE from the IMS responsive to the determination that all calls of the UE have ended.

10. The MSC of claim 9, wherein the MSC is further configured to maintain the IMS registration of the UE in the IMS after reception of the Cancel Location message.

11. A Mobile Switching Center (MSC) for controlling set up of a terminating call from an IP Multimedia Subsystem (IMS) to a User Equipment (UE) in a Circuit Switched Fallback (CSFB) situation, the MSC supporting IMS Centralized Services (ICS), the MSC being configured to:
    receive a location update request from the UE;
    responsive to reception of the location update request, send a Send Identification message to a further MSC, the further MSC supporting ICS and the Send Identification message including an identification for the MSC;

subsequent to sending of the Send Identification message, receive a terminating call set up request from the further MSC and forward the terminating call set up request to the UE;

subsequent to reception of the terminating call set up request, receive further messages related to ongoing calls of the UE from the IMS via the further MSC;

subsequent to reception of the terminating call set up request, send further messages related to ongoing calls of the UE to the IMS via the further MSC;

determine that all calls of the UE have ended; and trigger registration of the UE into the IMS responsive to the determination that all calls of the UE have ended.

12. The MSC of claim 11, wherein the MSC is further configured to suppress registration of the UE into IMS at reception of the terminating call set up request.

13. A system for controlling set up of a terminating call from an IP Multimedia Subsystem (IMS) to a User Equipment (UE) in a Circuit Switched Fallback (CSFB) situation, the system comprising
a first Mobile Switching Center (MSC);
a second MSC;
an IMS;
a UE; and
a Home Location Register (HLR);
wherein the first MSC is for controlling set up of a terminating call from the IP Multimedia Subsystem (IMS) to the User Equipment (UE) in a Circuit Switched Fallback (CSFB) situation, the MSC supporting IMS Centralized Services (ICS), and is configured to:
receive, from the IMS, a terminating call set up request for the UE;
in response to reception of the terminating call set up request, send a paging message to the UE;
subsequent to sending of the paging message, receive a Send Identification message from the second MSC, the second MSC supporting ICS and the Send Identification message including an identification for the second MSC;
subsequent to sending of the paging message, receive a Cancel Location message from the Home Location Register (HLR);
responsive to receiving the Send Identification message from the further MSC, forward the terminating call set up request to the second MSC;
subsequent to forwarding the terminating call set up request, relay further messages related to ongoing calls of the UE between the second MSC and the IMS;
determine that all calls of the UE have ended; and
trigger de-registration of the UE from the IMS responsive to the determination that all calls of the UE have ended; and
wherein the second MSC is configured to:
receive a location update request from the UE;
responsive to reception of the location update request, send a Send Identification message to the first MSC ICS, wherein the Send Identification message includes an identification for the second MSC;
subsequent to sending of the Send Identification message, receive a terminating call set up request from the first MSC and forward the terminating call set up request to the UE;
subsequent to reception of the terminating call set up request, receive further messages related to ongoing calls of the UE from the IMS via the first MSC;
subsequent to reception of the terminating call set up request, send further messages related to ongoing calls of the UE to the IMS via the first MSC;
determine that all calls of the UE have ended; and
trigger registration of the UE into the IMS responsive to the determination that all calls of the UE have ended.

* * * * *